Jan. 31, 1956     H. V. ELLIOTT     2,733,309
DIRECTIONAL SIGNAL SWITCH

Filed Dec. 17, 1951     3 Sheets-Sheet 1

Inventor
Harold Vernon Elliott
By Willits, Helmig & Baillio
Attorneys

Jan. 31, 1956

H. V. ELLIOTT 2,733,309

DIRECTIONAL SIGNAL SWITCH

Filed Dec. 17, 1951

Inventor
Harold Vernon Elliott
By
Willits, Helwig & Gailho
Attorneys

Jan. 31, 1956          H. V. ELLIOTT          2,733,309
DIRECTIONAL SIGNAL SWITCH
Filed Dec. 17, 1951          3 Sheets-Sheet 3
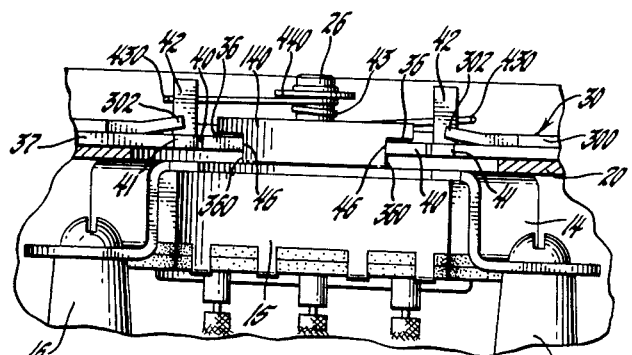
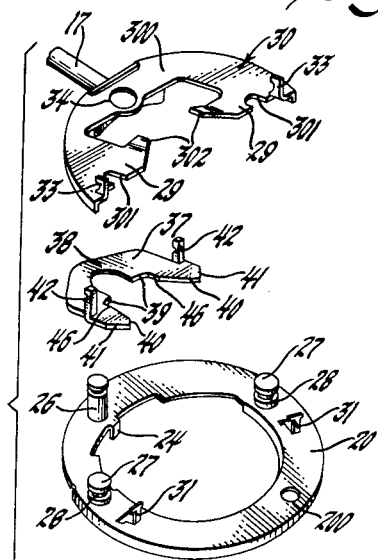
Inventor
Harold Vernon Elliott
By Willits, Helmig & Baillio
Attorneys

United States Patent Office 2,733,309
Patented Jan. 31, 1956

2,733,309

DIRECTIONAL SIGNAL SWITCH

Harold V. Elliott, Anderson, Ind., assignor to General Motors Corporation, Detroit, Mich., a corporation of Delaware Application December 17, 1951, Serial No. 262,047

12 Claims. (Cl. 200—61.34)

This invention relates to directional signal systems for automobiles, and in particular to directional signal switches of the manually set automatic cancelling type mountable on the steering column of an automobile and which control the electric circuits of the vehicle directional signalling system employed.

The primary object of the invention is to provide improved positive latch type directional signal switch resiliently latched in its neutral or off position and which may be unlocked and moved manually to a turn position with minimum operating lever travel.

Another object of the invention is to provide a directional signal switch employing improved non-locking features positively preventing locking of the steering mechanism of the automobile with which it is associated.

A further object of the invention is to provide an improved positive latch type directional signal switch for automobiles which is economical to manufacture and assemble, and which is readily installed and easily removed for service.

Other objects of the invention will become apparent by reference to the following detailed description taken in connection with the accompanying drawings, in which:

Figure 5 is a fragmentary detailed sectional view taken on the line 5—5 of Figure 3.

Figure 6 is an exploded view in perspective showing the major elements of the embodiment of the invention illustrated.

Figure 1:
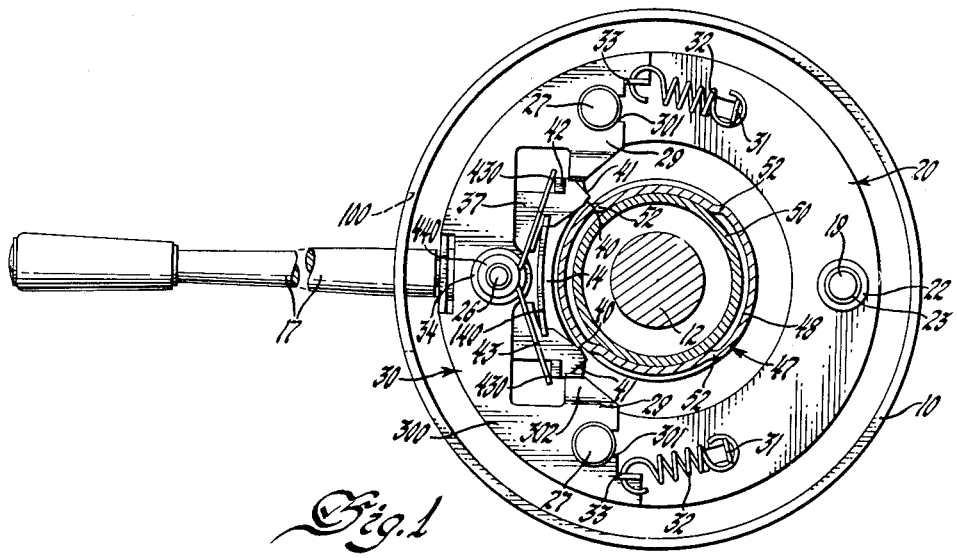
Figure 1 is a plan view of a directional signal switch embodying the invention mounted on the steering column in operating relationship to the steering wheel and steering shaft of an automobile taken on the line 1—1 of Figure 2.
Figure 2:
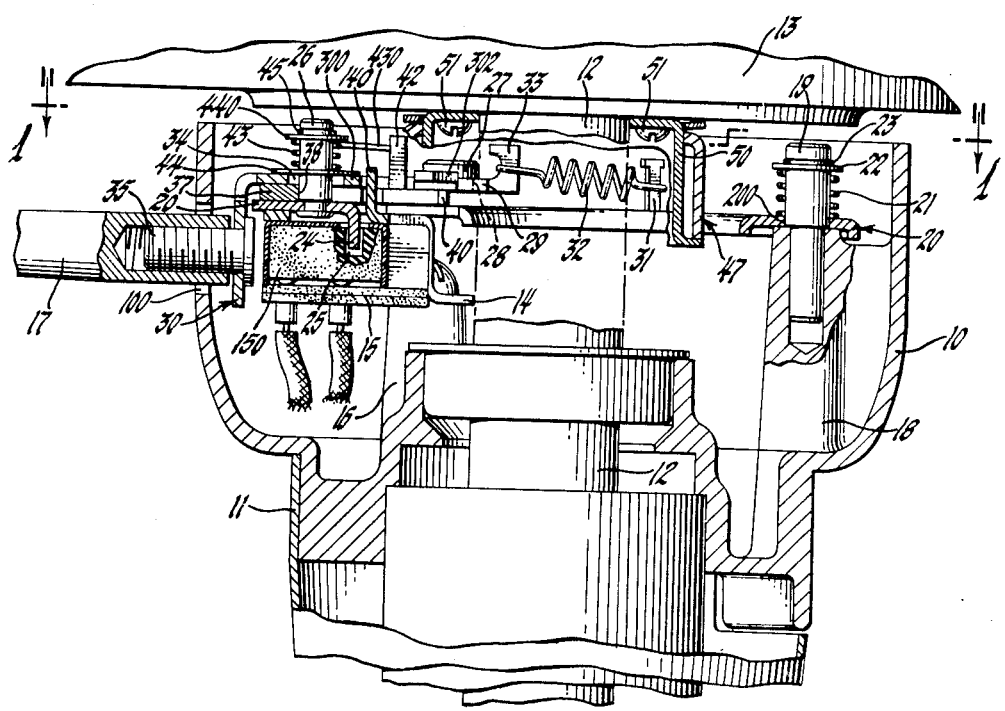
Figure 2 is an enlarged detailed vertical sectional view.

Referring now to the drawings wherein like numerals refer to like and similar parts throughout the several views, the illustrative embodiment of the invention is shown mounted in a housing 10 fixed on the steering column 11 of an automobile through which a steering shaft 12 is journaled, the said steering shaft 12 having a steering wheel assembly 13 splined thereon in the usual manner. The housing 10 is preferably of a streamlined bulbous shape and has an annular outside wall disposed in spaced relationship from the steering shaft 12. At one side of the housing 10, usually to the left as shown in the drawings, is an arcuate switch mounting bracket 14 into which an arcuate switch element 15 is positioned. The arcuate switch mounting bracket 14 is supported by and secured to a pair of relatively low posts or stanchions 16 extending upwardly from the bottom of the housing 10. The arcuate switch element 15 may be of any suitable construction to accomplish the selective making and breaking of directional signal circuits, neutral or off position thereof usually being in the center of the switch element, right turn position being arcuately forward of the center thereof, and left turn position being arcuately rearward of the center. To the left, as viewed in the drawings, and radially opposite the center of the switch element 15 is a slotted aperture 100 in the housing 10 which accommodates a manually set automatic return switch operating lever 17 connected to the arcuate switch element 15 through mechanism hereinafter described in detail.

The housing 10 is provided with a third relatively high post of stanchion 18 diametrically opposite the center of the arcuate switch element 15, the said stanchion 18 having a mounting pin 19 extending upwardly therefrom onto which is swingably mounted an annular base plate and pin assembly 20. In the particular construction shown in the drawings, the said annular base plate and pin assembly 20 is suitably apertured at 200 at the right side thereof to telescope over the mounting pin 19 onto which is positioned a compression spring 21 interposed between the said annular base plate and pin assembly 20 and a washer 22 secured on the upper end of the said pin 19 by such suitable means as a snap ring 23. This construction permits limited vertical tilting of the said annular base plate and pin assembly 20 about its swingable axis whereby to prevent bending of the said base plate assembly due to any upward or downward movement of the operating lever 17. The said annular base plate and pin assembly 20 is provided with a downwardly extending tab 24 diametrically opposite its mounting pin 19 which is positioned in a well 25 of an arcuately movable contact carrier 150 of the arcuate switch element 15, such connection causing the movable contact carrier 150 of the arcuate switch element 15 to be moved from its neutral or off position to either turn position or vice versa responsive to swinging movement of said annular base plate and pin assembly 20 about its mounting pin 19 in the relatively high post or stanchion 18.

The said base plate and pin assembly 20 is provided with an upwardly disposed trigger cam pin 26 diametrically opposite the swingable mounting aperture 200 therein and two trigger cover plate abutment pins 27 arcuately spaced from the trigger cam pin 26, one on each side thereof. The said trigger cover plate abutment pins 27 are preferably circumferentially grooved at 28 to receive the complementarily slotted ends 29 of a more or less arcuate trigger cover plate 300 of the trigger cover plate and lever assembly 30 in a manner permitting the said trigger cover plate and operating lever assembly 30 to pivot about either one or the other of the trigger cover plate abutment pins 27. The said base plate and pin assembly 20 has struck upwardly therefrom a pair of T-shaped spring anchors 31 onto which one end of tension springs 32 are engaged, the other end of the said tension springs 32 being engaged on upwardly disposed spring anchor hooks 33 formed on the ends of the arcuate trigger cover plate 300 of the trigger cover plate and operating lever assembly 30. These tension springs 32 resiliently hold the trigger cover plate and operating lever assembly 30 in its normal position with the slotted ends 29 of the arcuate plate 300 thereof in abutment against the trigger cover plate abutment pins 27 of the base plate and pin assembly 20.

The arcuate plate 300 of the trigger cover plate and operating lever assembly 30 is suitably apertured at 34 to telescope over the trigger cam pin 26 in sufficient spaced relationship thereto to permit the trigger cover plate and operating lever assembly 30 to pivot to a limited extent about one or the other of the trigger cover plate abutment pins 27 upon the initial portion of the movement of the operating lever from its neutral or off position toward one or the other of its turn positions for the purpose and as hereinafter more fully described. The central portion of the outer edge of the trigger cover plate 300 is turned down and is provided with an outwardly extending stud 35 onto which the inner end of the switch operating lever 17 of the trigger cover plate and operating lever assembly is threaded.

Referring now to the arcuate switch mounting bracket 14, it will be noted that the said bracket 14 is provided with an arcuate upstanding lug 140 notched at its ends at 36 to receive a trigger element 37. The trigger element 37 is generally U-shaped and is provided with a deep narrow central notch 38, a shallow wide central notch 39, an override cancelling cam contact surface 40 and a return cancelling cam contact surface 41 at each side of the wide notch 39, and upstanding suitably notched spring abutments 42 at the sides thereof.

Figure 3:
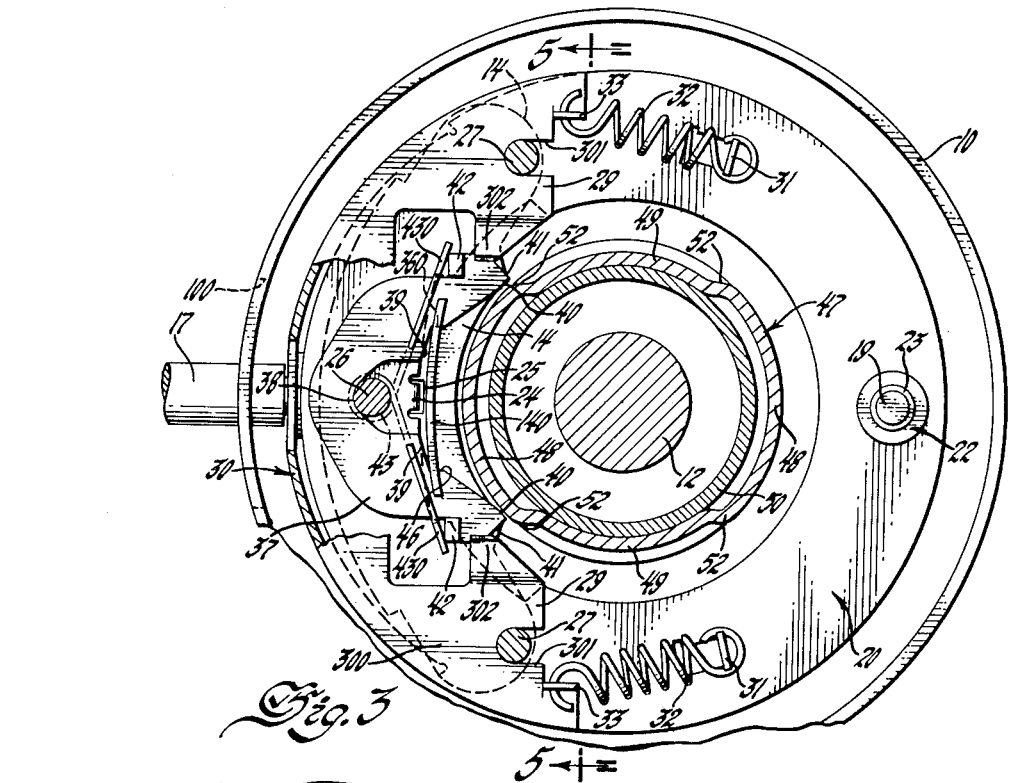
Figure 3 is an enlarged detailed plan view similar to Figure 1 with portions broken away, the switch mechanism being shown in its neutral or off position.
Figure 4:
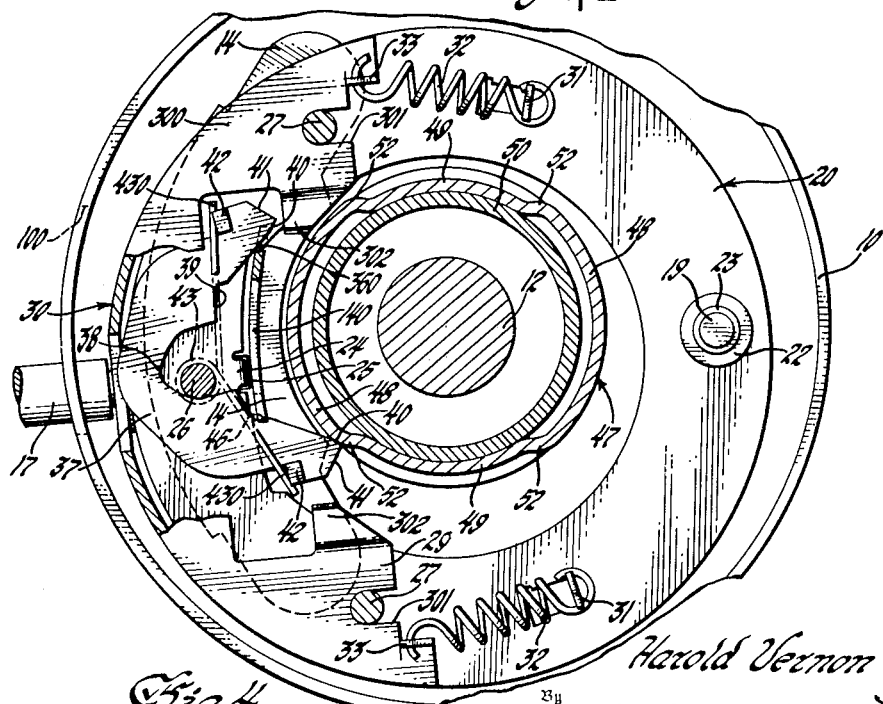
Figure 4 is an enlarged detailed plan view similar to Figure 3 with the switch mechanism shown in its left turn position.

The trigger element 37 is interposed in sliding relationship between the said base plate and pin assembly 20 and the trigger cover plate and operating lever assembly 30 with the deep central notch 38 of the trigger element 37 located around the trigger cam pin 26. The shape of the deep central notch 38 of the trigger element 37 is such that it permits the trigger element to move or float in respect to the trigger cam pin 26 from a central inward position in respect thereto as shown in Figure 3 to a side outward position in respect thereto when the trigger lever 17 is moved to a turn position as shown in Figure 4. The said trigger element 37 is maintained resiliently in its neutral position as shown in Figure 3 central in respect to the trigger cam pin 26 by a washer 44, a double end torsion coil spring 43 telescoped onto the trigger cam pin 26 and retained thereon by a second washer 440 and a snap ring 45, the free ends 430 of the torsion spring 43 engaging the spring abutments 42 of the trigger element 37 at the spring detent notches provided therein. The trigger cover plate 300 has a relatively large central opening through which the upstanding spring abutments 42 extend, and is suitably notched at 301 to accommodate the abutment pins 27. The inwardly facing portions 302 of the trigger cover plate 300 are bent slightly upward to assure smooth sliding movement between the trigger cover plate 300 and the trigger element 37.

When the directional signal switch is in its neutral or non-turn position as indicated in Figure 3, the trigger element 37 is urged inwardly toward and in abutment against the upstanding lug 140 of the switch mounting bracket 14 with the notches 46 at the sides of the shallow wide notch 39 of the trigger element 37 positioned adjacent the vertcial walls 360 of the upstanding lug 140 of the switch mounting bracket 14 at the base of the notches 36 therein. This construction latches the directional signal switch mechanism in its neutral or off position.

A cancelling cam 47 is mounted on the steering wheel assembly 13 concentrically around the steering shaft 12 by such means as a bracket 50 and suitable studs 51. The said cancelling cam 47 is annular in form with high and low lands 48 and 49, respectively, thereon. The said cam 47 is formed with relatively flat cam faces 52 between its lands 48 and 49 as best shown in Figures 3 and 4. As viewed in Figure 3, when the directional signal switch is in its neutral or off position, none of the cancelling cam contact faces 40 and 41 of the trigger element 37 ride either the high or the low cam lands 48 and 49 of the cancelling cam 47. The mounting of the cancelling cam 47 on the steering wheel assembly 13 causes the said cancelling cam 47 to turn with the steering shaft 12. It is obvious that the said cancelling cam 47 may be mounted directly on the steering shaft 12 if desired.

To indicate a turn, a left turn for example, the switch operating lever 17 is moved counterclockwise from its neutral position shown in Figure 3 to its left turn position shown in Figure 4. During the initial stage of the left turn indicating movement of the operating lever 17, the trigger cover plate and operating lever assembly 30 pivots counterclockwise about the lowermost trigger cover plate abutment pin 27 of the base plate and pin assembly 20 as viewed in Figure 3, which pivoting action causes the slightly upturned portion 302 of the trigger cover plate 300 adjacent the uppermost spring abutment 42 of the trigger element 37, as viewed in Figure 3, to contact the said abutment 42 and turn the trigger 37 sufficiently counterclockwise to unlatch the directional switch mechanism from its neutral or off position by moving the uppermost notch 46 of the trigger element 37, as viewed in Figure 3, away from the vertical wall 360 at the notch 36 of the upstanding lug 140 of the switch bracket 14. After this unlatching of the directional switch mechanism from its neutral or off position, the trigger cover plate and operating lever assembly 30 pivots clockwise about the lowermost trigger cover plate abutment pin 27 responsive to spring action of the uppermost tension spring 32, and, further movement of the operating lever 17 toward its left turn position shown in Figure 4 swings the base plate and pin assembly 20, the trigger cover plate and operating lever assembly 30, the trigger element 37 and the arcuate movable contact carrier 150 of the arcuate switch element 15 as a unit to their left turn position.

During the movement of the directional switch mechanism from its neutral to left turn position just described, the trigger cam pin 26 of the base plate and pin assembly 20 causes the trigger element 37 to cam about the vertical wall 360 of the notch 36 at the uppermost side of the arcuate switch mounting bracket 14 as viewed in Figure 4. This brings the cancelling cam contact surface 40 of the trigger element 37 into contact with the cancelling cam 47 which is resiliently held thereagainst by the torsion spring 43. When the steering wheel 13 is turned counterclockwise to make a left turn indicated responsive to the above described left turn setting of the directional switch mechanism, the cancelling cam contact surface 40 of the trigger element 37 rides the high land 48, the relatively flat cam face 52 and onto the adjacent low land 49 of the cancelling cam 47. After the vehicle makes the left turn, the steering wheel is then turned clockwise to resume straight forward driving. This turns the cancelling cam 47 clockwise whereupon the cam face 52 of the cancelling cam 47 over which the cancelling cam contact surface 40 of the trigger element 37 has just ridden engages the cancelling cam contact surface 41 of the trigger element 37 and returns the entire directional signal switch mechanism from the left turn position shown in Figure 4 to the neutral or off position shown in Figure 3, whereupon the trigger element 37 springs into its latched position as hereinbefore described. Inasmuch as the directional switch mechanism is symmetrical about its operating lever 17, a right turn indication is accomplished in a like and similar manner to the left turn indication hereinbefore described in detail.

After the operating lever 17 is moved to left or right turn position, the operator of the vehicle may cancel the turn indication by moving the operating lever manually to its neutral or off position. The spring loaded floating trigger element 37 is designed to prevent its locking in any position except in the neutral or off position where it resiliently latches the entire directional switch mechanism and except in the left or right turn position where it resiliently retains the entire directional signal mechanism in the selected turn position. If any element of the directional switch mechanism should stick or bind in a manner that would lock the turning of the steering wheel of the automobile upon which directional signal switch mechanism embodying the invention is installed, either the torsion spring 43 or one of the tension springs 32 or all of them will yield sufficiently to disengage the cancelling cam return contact surface 41 from the cam face 52 with which it may be locked.

Although but a single embodiment of the invention has been disclosed and described herein, it is obvious that many changes may be made in the size, shape, arrangement and detail of the several elements of the invention without departing from the spirit and scope thereof as defined by the appended claims.

I claim:
1. In a directional signal of the manually set automatic cancelling type mountable on the steering column of an automobile comprising a housing fixable on said steering column around the steering shaft therein, a cancelling cam element on said steering shaft turnable therewith, a switch element fixed in said housing, a switch operating assembly comprising a base plate swingably mounted in said housing and means engaging said switch element for operating the same, a cover plate mounted on said base plate including an operating lever extending therefrom through said housing, a trigger element disposed in limited floating relationship between said base plate and said cover plate, and spring means urging said trigger element against said cancelling cam when said switch operating assembly is moved manually from its neutral position to a turn position, said cancelling cam engaging said trigger and returning said switch operating assembly to its neutral position responsive to turning the steering shaft from said turn position toward its straight driving position.

2. In a directional signal switch of the manually set automatic cancelling type mountable on the steering column of an automobile comprising a housing fixable on said steering column around the steering shaft therein, a cancelling cam element on said steering shaft turnable therewith, a switch element and a stop fixed in said housing, and switch operating mechanism engaging said switch element for operating the same swingably mounted in said housing including an operating lever extending therefrom and a floating spring loaded trigger element, said trigger element being urged against said stop when said switch operating mechanism is in a neutral position and against said cancelling cam when said switch operating mechanism is moved to a turn indicating position, the said cancelling cam engaging said trigger to return said operating lever and switch operating mechanism to their neutral position responsive to turning the steering shaft in a direction opposite to the indicated turn, said trigger element engaging said stop preventing movement of said switch operating mechanism when said operating lever is in its neutral position, and means associated with said switch operating mechanism movable by said operating lever responsive to initial manual movement thereof toward a turn indicating position releasing said trigger from said latched engagement with said stop.

3. In a directional signal of the manually set automatic cancelling type mountable on the steering column of an automobile comprising a housing fixable on said steering column around the steering shaft therein, a cancelling cam element turnable with said steering shaft, a switch element and a stop fixed in said housing, a switch operating assembly comprising a base plate swingably mounted in said housing and means engaging said switch element for operating the same, a cover plate pivotally mounted on said base plate including an operating lever extending therefrom through said housing, a trigger element disposed in limited floating relationship between said base plate and said cover plate, and spring means urging said trigger element against said cancelling cam when said switch operating assembly is moved manually from its neutral position to a turn position, said cancelling cam engaging said trigger and returning said switch operating assembly to its neutral position responsive to turning the steering shaft from said turn position toward its straight driving position, said trigger element being formed to engage said stop preventing movement of said switch operating mechanism when said operating lever is in its neutral position, said cover plate pivoting in respect to said base plate responsive to initial manual movement of said operating lever toward a turn indicating position engaging said trigger and moving the same out of latched engagement with said stop.

4. A directional signal switch of the manually set automatic cancelling type mountable on the steering column of an automobile comprising a housing on said steering column spaced around the steering shaft therein, a cancelling cam having trigger engaging faces thereon mounted to rotate with said steering shaft, a switch element in said housing, switch element actuating means swingable within said housing engaging said switch element, trigger operating means including an operating lever extending therefrom disposed over said swingable means and connected thereto, a trigger element floatingly positioned between said switch element actuating means and said trigger operating means, spring means constantly urging said trigger toward said cancelling cam, a stop fixed in respect to said housing preventing movement of said trigger into engagement with said cancelling cam when said trigger operating means is in its neutral position, said trigger being cammed about said stop when said trigger operating means is moved to a turn indicating position permitting said spring means to urge said trigger against said cancelling cam, a cam face of said cancelling cam engaging said trigger and returning said switch mechanism to neutral responsive to turning the vehicle steering shaft from said turn position toward its straight driving position.

5. In a directional signal switch of the type mountable on the steering column of an automobile comprising a housing on said steering column disposed around the steering shaft therein, a cancelling cam element turnable with said steering shaft, a switch element and a stop fixed in said housing, a switch operating mechanism comprising a base plate swingably mounted in said housing and means engaging said switch element for operating the same, a cover plate pivotally mounted on said base plate including spring means connecting said base plate to said cover plate limiting the pivotal movement of the cover plate in respect to said base plate, an operating lever connected to said cover plate extending therefrom through said housing, a trigger element disposed in limited floating relationship between said base plate and said cover plate formed to engage and lock with said stop, spring means urging said trigger in locking engagement with said stop when the operating lever is in its neutral position, said cover plate pivoting in respect to said base plate and engaging said trigger imparting movement to said trigger to release the same from said stop responsive to initial movement of the operating lever from neutral toward a turn position, the said cancelling cam engaging said trigger responsive to moving the steering shaft from said turn position toward its straight driving position and returning said switch operating mechanism to its neutral locked position.

6. In a directional signal switch of the type mountable on the steering column of an automobile comprising a housing on said steering column disposed around the steering shaft therein, a cancelling cam element turnable with said steering shaft, a switch element and a stop fixed in said housing, a switch operating mechanism comprising a base plate swingably mounted in said housing and means engaging said switch element for operating the same, a cover plate pivotally mounted on said base plate including spring means connecting said base plate to said cover plate limiting the pivotal movement of the cover plate in respect to said base plate, an operating lever connected to said cover plate extending therefrom through said housing, a trigger element disposed in limited floating relationship between said base plate and said cover plate formed to engage and lock with said stop, spring means urging said trigger in locking engagement with said stop when the operating lever is in its neutral position, said cover plate pivoting in respect to said base plate and engaging said trigger imparting movement to said trigger to release the same from said stop responsive to initial movement of the operating lever from neutral toward a turn position, said trigger being cammed by said cover plate about said stop responsive to continuing movement of the operating lever to said turn position permitting said spring means to urge said trigger against said cancelling cam.

7. In a directional signal switch of the type mountable on the steering column of an automobile comprising a housing on said steering column spaced around the steering shaft therein, a switch element in said housing, switch element actuating means swingable within said housing engaging said switch element, trigger operating means including an operating lever extending therefrom disposed over said swingable means and pivotally connected thereto at points each side said operating lever, spring means connected between said switch element actuating means and said trigger operating means resiliently maintaining said trigger operating means in non-pivotal relationship to said switch element actuating means, a trigger element floatingly positioned between said switch element actuating means and said trigger operating means, a cancelling cam rotatable with said steering shaft including trigger engaging faces therein, spring means constantly urging said trigger toward said cancelling cam, a stop fixed in respect to said housing preventing movement of said trigger into engagement with said cancelling cam when said trigger operating means is in its neutral position, notches formed on said trigger engaging said stop and locking said trigger in its neutral position, said trigger operating means pivoting about one of its pivots upon the initial movement of said operating lever toward a turn position and engaging and moving said trigger out of its locked position, said trigger being cammed about said stop when said trigger operating means is moved further to said turn indicating position permitting said spring means to urge said trigger against said cancelling cam when the vehicle steering shaft is turned in the direction of the indicated turn, one of the cancelling cam faces engaging said trigger returning said trigger and switch mechanism to neutral locked position responsive to turning the vehicle steering shaft from said turn position toward its straight driving position.

8. A direction signal switch comprising a fixed housing, a cover member, a canceling cam rotatably disposed in said housing, a switch mounted in said housing, switch operating means pivotally mounted in said housing for movement from a neutral position to switch operating positions at opposite sides of said neutral position, said operating means comprising a base plate, a trigger element disposed in limited floating relation on said base plate, resilient means urging said trigger element into engagement with said canceling cam upon the movement of said operating member to switch operating positions, said trigger being adapted to return said switch and said operating means to neutral position upon rotation of said cam in a direction opposite that of the indicated turn, and additional resilient means connecting said base plate and said cover member to permit said trigger element to over-ride said canceling cam when normal movement of said operating means is obstructed.

9. A direction signal switch mechanism comprising a fixed housing, a canceling cam rotatably disposed in said housing, a multiposition switch mounted in said housing, a switch operating member pivotally secured in said housing for movement from a neutral position to switch operating positions at opposite sides of said neutral position said operating member comprising a base plate having a struck-up projection formed thereon, a trigger element disposed in limited floating relation about said projection, and a cover plate pivotally disposed on said projection and over-lying said trigger element, resilient means urging said trigger element against said canceling cam upon movement of said operating member to a switch operating position, said trigger being adapted to return said switch and said operating member to neutral position upon rotation of said cam in a direction opposite that of the indicated turn, and spring means connecting said base plate and said cover member and providing limited movement of said cover member whereby said trigger element may over-ride said canceling cam when normal movement of said operating member is prevented.

10. A direction signal switch mechanism comprising a fixed housing, a switch mounted in said housing, switch operating member swingably mounted in said housing, a rotatable cam disposed in said housing, a trigger yieldably secured on said operating member, and movable into engagement with said cam, a cover member including an operating handle, said cover member being resiliently secured on said operating member and having portions engageable by said trigger member, and means connecting said cover member and said operating member permitting limited pivotal movement of said cover member relative to said operating member, to permit said trigger to override the canceling action of said cam when normal movement of said operating member is obstructed.

11. In a device of the class described, the combination of a switch movable from an open neutral position to switch closing positions at opposite sides of said neutral position, a fixed support, an operating member for said switch, a trigger element, a rotatable cam, yieldable means urging said trigger into engagement with said cam upon movement of said operating member to a switch closing position, cover means on said operating member adapted to retain said trigger in said cam engaging position, said trigger being adapted to return said cover member and said operating member to neutral position in response to rotation of said cam in a direction opposite that of the indicated turn, and resilient means connecting said cover member and said operating member whereby said trigger member may over-ride said cam when return movement of said operating member is obstructed.

12. A direction signal switch mechanism comprising a fixed housing, a canceling cam rotatably disposed in said housing, a multi-position switch mounted in said housing, a switch operating member pivotally mounted in said housing for movement from a neutral position to switch operating positions at opposite sides of said neutral position, said switch operating member having a trigger element and a cover member disposed thereon about a common pivot, flexible means urging said trigger against said cam, projecting means on said trigger engageable with said cover member upon movement of said trigger against said cam, said trigger being adapted to return said operating member to neutral position in response to rotation of said cam in a direction opposite that of the indicated turn, and additional flexible means connecting said cover member and said operating member permitting limited pivotal movement of said cover member whereby said trigger may swing outwardly to over-ride said cam when normal swingable movement of said operating member is prevented.

References Cited in the file of this patent
UNITED STATES PATENTS

| | | |
|---|---|---|
| 2,276,413 | Moore | Mar. 17, 1942 |
| 2,299,876 | Breeze | Oct. 27, 1942 |
| 2,643,308 | Lincoln et al. | June 23, 1953 |